Figure 1:
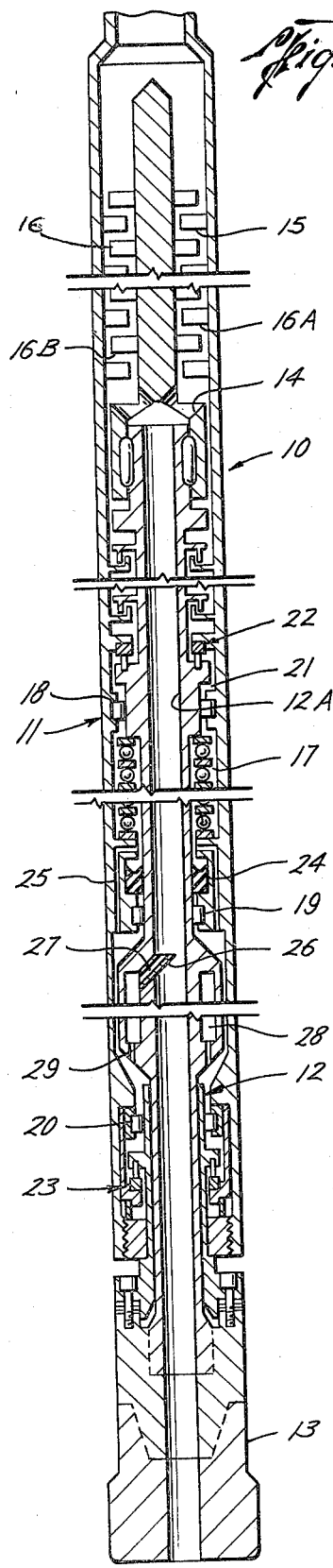

United States Patent [19]

Fox

[11] 4,308,927

[45] Jan. 5, 1982

[54] WELL DRILLING TOOL

[75] Inventor: Fred K. Fox, Austin, Tex.

[73] Assignee: Engineering Enterprises, Inc., Houston, Tex.

[21] Appl. No.: 136,358

[22] Filed: Apr. 1, 1980

[51] Int. Cl.³ .............................................. E21B 4/02
[52] U.S. Cl. ...................................... 175/107; 277/11
[58] Field of Search ...................... 175/107; 277/9, 11, 277/81 R

[56] References Cited

U.S. PATENT DOCUMENTS

| | | | |
|---|---|---|---|
| 2,646,962 | 7/1953 | Wagner | 175/107 |
| 3,042,414 | 7/1962 | Tracy | 277/11 |
| 3,894,818 | 7/1975 | Tschivky | 175/107 |
| 3,971,450 | 7/1976 | Fox | 175/228 X |
| 4,039,196 | 8/1977 | Inouye | 277/11 |

Primary Examiner—William F. Pate, III
Attorney, Agent, or Firm—Marvin B. Eickenroht; Jennings B. Thompson

[57] ABSTRACT

There is disclosed a turbodrill having thrust bearings received within an annular space between its shaft and case to support the shaft for rotation within the case, and a face seal closing off the lower end of the space beneath seal rings forming a lubricant chamber in which the bearings are contained. One seal ring of the face seal is carried by the case for rotation therewith, and the other seal ring thereof is carried by a sleeve for rotation therewith. The sleeve extends from within the space to a level beneath the case, and is connected to the shaft for rotation therewith. Means are provided for moving the sleeve longitudinally with respect to the shaft in order to adjust the preload applied by springs to the other seal ring of the face seal.

3 Claims, 2 Drawing Figures

U.S. Patent    Jan. 5, 1982    4,308,927

WELL DRILLING TOOL

This invention relates generally to well drilling tools having a body including inner and outer tubular members which are connected as a part of a drill string within a well bore and which are supported for relative rotation by means of bearings contained within a lubricant chamber formed between upper and lower seals in an annular space between the members, the bore of the inner member being open to the space above the lubricated bearing chamber in order that drilling fluid circulated downwardly through the drilling string is directed into the bore for circulation therethrough and out the lower end of a bit on the lower end of the drill string. More particularly, this invention relates to improvements in tools of this type wherein a port connects the bore of the inner member with the space beneath the lubricated bearing chamber, and the space beneath the port is closed by a face seal, so that the pressure differential between the inside and outside of the tool which results from the pressure drop across the bit acts across the face seal, and the upper and lower seals serve primarily to separate drilling fluid from the lubricant within the lubricated bearing chamber, and thus protect the bearings from abrasive particles in the drilling fluid.

U.S. Pat. No 3,971,450 shows turbodrills of this construction wherein the outer member comprises a case suspended from the lower end of the drill string and the inner member comprises a shaft from which the bit is suspended. A motor, such as a turbine, is disposed within the annular space between the case and shaft for rotating the shaft and thus the bit without the necessity for transmitting torque from the surface to the case through thousands of feet of drill string.

A conventional face seal, which is useful in withstanding the high pressure differential, has relatively rotatable rings made of wear-resistant material, such as tungsten carbide, with one such ring being carried by each of the shaft and case in order to dispose annular sealing faces on their ends in a position to slide over one another during rotation of the shaft with respect to the case. One of the rings is preloaded by means of a coil spring acting between it and an end wall of the tubular member on which it's carried.

Although the spacing between the face of the preloaded ring and the end wall of the member on which it's carried, and thus the preload of the spring, may be properly adjusted before the face seal is installed, there is no guarantee and in fact little likelihood that this spacing will not change upon installation. Thus, the longitudinal distance between points on the outside of the shaft and inside of the case on which the face seal rings are carried may vary a considerable amount due to substantial tolerances which result from "stacking" the bearings, spacer sleeves, and other parts on the inner and outer diameters of the case and shaft, respectively, during the assembly of a tool of the type described, or for that matter, due to wear on the sealing faces of the rings following extended use. This is expecially true when, as in a tool of the type above described, the face seal is located in the lower end of the annular space between the case and shaft so that the spacing of their support surfaces depends on the accumulation of tolerances over substantial portions of the lengths of both the case and shaft.

However, once the face seal is installed within the space between the members, there is no way, in existing tools of this type, to adjust the spacing between these surfaces and thus no way to restore the proper preload to the spring. Hence, it is the primary object of this invention to provide a tool of this type in which the preload of the spring may be adjusted to a desired extent from the outside of the tool, and thus following stacking of the bearings, spacer sleeves and the like on the shaft and case, and/or following wear of the sealing faces of the face seal rings.

This and other objects are accomplished, in accordance with the illustrated embodiment of the present invention, by a tool of the type described wherein one of the rings of the face seal is carried by and rotatable with a sleeve which extends longitudinally downwardly within the annular space between the inner and outer tubular members to a level beneath the lower end of the outer member. More particularly, the sleeve is connected to one of the tubular members for rotation with it, and the other ring of the face seal is carried by the other of the tubular members for rotation with it, so the annular end faces of the rings slide over one another as the tubular members are rotated with respect to one another, and a spring acts between an end wall of the sleeve and the ring carried by the sleeve in order to yieldably urge the end face of such ring against the end face of the other ring. More particularly, means are provided for sealing between the sleeve and the one tubular member to which it is connected, and a means which is manipulatable from the exterior of the tool is provided for moving such sleeve longitudinally of the tubular member to which it is connected in order to adjust the spacing between the end wall of such member and the ring carried thereby, and thus the force of the spring. In use, the distance between given points along the lengths of the sleeve and the outer tubular member, and thus the spacing which determines said spring force, may be observed and measured from the exterior of the tool.

In the preferred embodiment of the invention, the sleeve is connected to the one tubular member by bolts which extend through an outwardly projecting flange on the lower end of the sleeve and are threaded into tapped holes formed in a shoulder on the one member which faces oppositely to the flange. More particularly, shims are removably disposed within an exteriorly accessible space between the shoulder on such member and the flange, so that the distance between the flange and the lower end of the outer member may be adjusted by loosening the bolts to add or remove shims and then retightening the bolts to hold the shims securely between the shoulder and flange. Preferably, the shims are of a material which has a higher co-efficient of heat expansion than that of the bolts so that the shims are held more tightly between the shoulder and flange in the presence of increased heat within the well bore.

Figure 2:
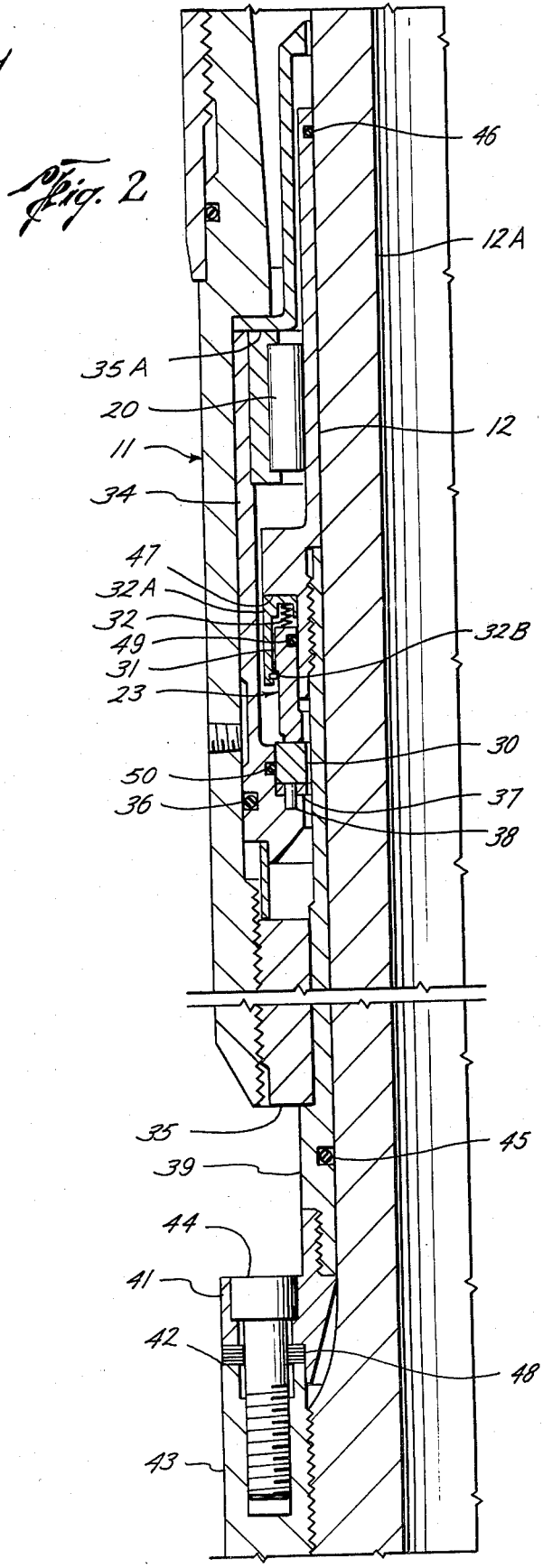

In the drawings wherein like reference characters are used throughout to designate like parts:

FIG. 1 is a vertical sectional view of a turbodrill constructed in accordance with the present invention, and discontinued at different levels along its length for purposes of clarity; and FIG. 2 is an enlarged, vertical sectional view of one half of the lower portion of the tool, which is also discontinued along its length for purposes of clarity.

With reference now to the details of the abovedescribed drawings, the overall turbodrill, which is indicated in its entirety by reference character 10, is shown in FIG. 1 to comprise a case 11 having an upper end adapted to be connected to the lower end of the drill string (not shown) and a shaft 12 mounted for rotation concentrically within the case to provide an annular space 15 therebetween. Thus, the case and shaft constitute relatively rotatable outer and inner members which make up a body forming a continuation of the lower end of the drill string, and a bit 13 is connected to the lower end of the shaft.

As well known in the art, the tool is lowered on the drill string into a well bore, and drilling fluid is circulated downwardly through the drill string and out the lower end of the bit, and then upwardly within the annulus between the tool and the well bore. Ports 14 in the shaft connect an upper portion of the annular space between the shaft and case with a bore 12A through the shaft which connects at its lower end with a bore through the bit 13.

In the illustrated turbodrill, shaft 12 is rotated with respect to case 11, so as to in turn impart rotation to bit 13, by means of a turbine section 16 within annular space 15 comprising stators 16A on the inner diameter of the case and rotors 16B on the outer diameter of the upper end of the shaft. The rotors and stators are so arranged that the shaft and thus the bit is caused to rotate in response to circulation of drilling fluid downwardly through the turbine section.

Bearings for supporting the shaft from the case are received in the annular space 15 beneath the ports 14. As shown in FIG. 1, these bearings include axial thrust bearings 17 in the form of balls mounted between a downwardly facing shoulder on the shaft and an upwardly facing shoulder on the case, as well as radial bearings 18 and 19 above and below the thrust bearings and radial bearings 20 near the lower end of the space.

As shown, thrust bearings 17 are contained within a lubricant chamber 21 within the space formed between seals 22 and 24 sealing between the case and shaft, and another seal 23 seals between the case and shaft beneath the lowermost radial bearings 20. Both the upper and lower seals 22 and 23 are "face" type seals of well-known construction, but reversed end-for-end with respect to one another so that the upper seal is arranged to prevent flow therepast in an upward direction and the lower seal 23 is arranged to prevent flow therepast in a downward direction.

The intermediate seal 24 is a cup-type seal of resilient material having upwardly diverging lips on its inner and outer diameters which permit flow of lubricant therepast in an upward direction, but prevent it in a downward direction. Passageways 25 are formed in the case to connect the lubricated bearing chamber 21 above and below the intermediate seal 24, and a check valve (not shown) in each such passageway prevents flow therepast in an upward direction, but permits such flow in a downward direction in order to bypass seal 24 when the pressure in the chamber 21 exceeds that below it by a predetermined amount.

A short tube 26 mounted within the shaft has a port 27 therethrough which connects the bore 12A of the shaft with an annular reservoir 28 having its lower end connected to the annular space 15 between seals 24 and 23 by means of ports 29. As described in copending application Ser. No. 33,554, filed Aug. 27, 1979, and entitled "Well Drilling Tool", and assigned to the assignee of the present application, the reservoir is of considerable length, and an annular piston (not shown) is sealably slidable therein to separate well fluid within the shaft bore 12A from lubricant within the annular space between seals 24 and 23.

The piston will transmit fluid pressure within the shaft bore 12A to the annular space 15 below seal 24 and above seal 23. Consequently, pressure within the tool acts over seal rings 22 and 24 forming the annular lubricant chamber, so that there is little or no pressure differential thereacross, and the pressure differential between the inside and the outside of the tool is taken across the lowermost seal 23.

As previously described, during the assembly of turbodrill 10, various parts including the bearings, spacer sleeves, etc., are stacked on the inner and outer diameters of the case and shaft, respectively. When so stacked, nuts hold them against rotation with respect to the tubular member on which they are carried. As also previously described, this stacking of parts along substantial lengths of the case and shaft will cause considerable tolerances at the lower ends of the case and shaft, and thus in the vicinity of the seal 23 closing off the lower end of the annular space 15.

As shown in detail in FIG. 2, seal 23 comprises a lower seal ring 30 carried by the lower end of case 11 for rotation therewith, an upper seal ring 31 carried for rotation with the shaft, as will be described to follow, and coil springs 32 which urge the seal ring 31 downwardly so as to cause the annular sealing face on its lower end to tightly engage the annular sealing surface on the upper end of seal ring 30 during rotation of the shaft with respect to the case. In prior tools of this type, it has been customary to carry the upper seal ring and coil springs on the shaft itself. However, because of the aforementioned tolerances, as well as wear on the annular sealing faces on the ends of the seal rings, it has not been possible to maintain the desired preload on the upper seal ring because of the inability to predetermine the longitudinal spacing between the upper seal ring and the surface on the shaft against which the coil springs are engaged. Thus, if the spacing is too small, the preload applied by the springs is too great, and if the spacing is too large, the preload is too small.

In the embodiment of the tool 10 shown in detail in FIG. 2, the lower seal ring 30 is carried by an inner sleeve 34 which is held tightly between a nut 35 threadedly connected to the lower end of the case and a downwardly facing shoulder 35A on the inner diameter of the case. In this manner, the sleeve 34, which is sealed with respect to the case by means of O-rings 36, is caused to rotate with the case. More particularly, sleeve 34 is counterbored to receive seal ring 30, and a pin 38 carried by the sleeve fits closely within a slot 37 on the lower end of seal ring 30 to cause the seal ring to rotate with the sleeve 34 and thus with the case.

In accordance with the novel aspects of the present invention, a sleeve 39 is closely received about the outer diameter of the shaft 12 so as to extend downwardly within the annular space 15 to a level beneath the lower end of the case. As shown in FIG. 2, the roller bearings 20 are disposed between the sleeves 34 and 39 so as to maintain the desired spacing between them during rotation of the shaft with respect to the case.

The lower end of sleeve 39 has a flange 41 whose lower end is disposed above an upwardly facing shoulder 42 on a nut 43 of the shaft. The sleeve 39 is connected to the shaft for rotation therewith by means of bolts 44 which are threadedly connected to tapped holes formed in the shoulder on the upper end of the nut. O-rings 45 and 46 are carried on the inner diameter of the sleeve 39 for sealing with respect to the outer diameter of the shaft.

Coil springs 32 of seal 23 are received within a carrier 32A whose upper end is engaged by a downwardly facing shoulder 47 on sleeve 39, so that the longitudinal spacing between this shoulder and the annular sealing faces of seal ring 30 determines the preloading of spring 32. As shown in FIG. 2, the outer wall of carrier 32A extends downwardly over the outer side of seal ring 30 so as to surround and retain springs 32, and a snap ring 32B on the lower end of the wall extends beneath a shoulder on the outer side of the seal ring to hold the carrier in place.

The aforementioned spacing may be determined by measurement of the distance between the lower end of nut 35 of the case and the upper end of the flange 41 of the sleeve. Thus, by measuring this distance, the operator of the tool can determine when and to what extent adjustment is required to compensate for stacking tolerances and/or wear, and then adjust for this wear to the extent necessary, by moving the sleeve longitudinally with respect to the case.

For this latter purpose, a plurality of shims 48 are received about one or more bolts 44 intermediate the lower end of flange 41 and the shoulder 42 on nut 43. Thus, for example, if the operator detects that increased preload on the springs is required to compensate for wear, he need only remove the bolts 44 to permit removal of one or more of the shims 48, and then reconnect the bolts 44 to secure the remaining shims tightly between the flange 41 and the shoulder 42. On the other hand, if the operator determines, upon assembly of the tool, that tolerances due to stackup of parts along the inside of the case and outside of the shaft require that the spacing be increased or decreased, he need only adjust the sleeve upwardly or downwardly. Obviously, in order to move the sleeve 39 upwardly with respect to the shaft 12, the operator will, upon removal of the bolts 44, add additional shims 48.

In the preferred embodiment of the invention, the shims 48 are of a material having a higher coefficient of heat expansion than material of which bolts are formed. For example, the shims may be made of aluminum, while the bolts may be made of steel. Consequently, when the tool is used in a high temperature environment, such as found in the lower end of a well bore, the shims will expand at a greater rate than the flange and nut, and thus tighten their connection between the nut and flange.

To prevent fluid from bypassing the end sealing faces of the seal rings of the seal 23, an O-ring 49 is carried by the inner diameter of upper seal ring 31 for sealing with respect to the adjacent surface of the sleeve 39, and an O-ring 50 is carried by the inner diameter of the counterbored portion of sleeve 35 for sealing with respect to the outer diameter of seal ring 30.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A well drilling tool, comprising a body including inner and outer tubular members arranged concentrically of one another to provide an annular space therebetween and adapted to be connected as part of a drill string within a well bore, bearing means within the annular space to support the members for rotation with respect to one another, means sealing between the members above and below the bearing means so as to form a lubricant chamber in which the bearing means is contained, the bore of the inner member being open to the space above the lubricant chamber, whereby drilling fluid circulated downwardly through the drill string is directed into the bore for circulation therethrough and out the lower end of a bit on the lower end of the drill string, a port connecting the bore with the space below the lubricant chamber, a sleeve extending longitudinally downwardly within the space to a level beneath the lower end of the outer tubular member, a flange on the sleeve which faces a shoulder on one of said tubular members, bolts extending through the flange and threaded into tapped holes formed in the shoulder, to connect the sleeve to said one tubular members for rotation therewith, means sealing between said sleeve and said one tubular member, a face seal comprising a first ring carried by said sleeve for rotation therewith, a second ring carried by the other tubular member for rotation therewith, said rings having annular end faces which are disposed for sliding over one another during relative rotation of the tubular members, and a spring acting between an end wall of said sleeve and the first ring for yieldably urging the end face of the first ring against the end face of the second ring, the distance between given points along the lengths of said sleeve and outer tubular member, and thus the spacing between said end wall and end face of said first ring, being observable and measurable from the exterior of the tool, and shims removably disposable within an exteriorly accessible space between said flange and shoulder so that a selected number thereof may be held tightly therebetween in order to adjust said spacing and thus the force of the spring.

2. A tool of the character defined in claim 1, wherein said one tubular member is within said other tubular member and is surrounded by said sleeve.

3. A tool of the character defined in a claim 1, wherein the shims are of a material which has a higher coefficient of heat expansion than that of the bolt, so that the shims are held more tightly between the flange and shoulder in the presence of increased heat within the well bore.

* * * * *